United States Patent
Koenig et al.

(10) Patent No.: US 12,078,289 B1
(45) Date of Patent: Sep. 3, 2024

(54) MODULAR MOUNTING BRACKET AND METHOD OF MOUNTING ENCLOSURES

(71) Applicant: Preformed Line Products Company, Mayfield, OH (US)

(72) Inventors: Gregory Paul Koenig, Mayfield, OH (US); Cameron Clines, Mayfield, OH (US); Randy Cloud, Mayfield, OH (US); Chris Grubish, Mayfield, OH (US); Matt Mikulandra, Mayfield, OH (US)

(73) Assignee: Preformed Line Products Company, Mayfield, OH (US)

( * ) Notice: Subject to any disclaimer, the term of this patent is extended or adjusted under 35 U.S.C. 154(b) by 0 days.

(21) Appl. No.: 18/203,935

(22) Filed: May 31, 2023

(51) Int. Cl.
*F16M 13/02* (2006.01)
*G02B 6/48* (2006.01)

(52) U.S. Cl.
CPC ............ *F16M 13/02* (2013.01); *G02B 6/483* (2013.01)

(58) Field of Classification Search
CPC .. F16M 13/02; G02B 6/4446; G02B 6/44524; H02G 3/10
See application file for complete search history.

(56) References Cited

U.S. PATENT DOCUMENTS

| | | | | |
|---|---|---|---|---|
| 5,631,993 | A * | 5/1997 | Cloud ................. | G02B 6/4454 385/136 |
| 7,558,458 | B2 * | 7/2009 | Gronvall .............. | G02B 6/4472 385/134 |
| 10,177,548 | B2 * | 1/2019 | Ledgerwood ........... | H02B 1/28 |
| 10,973,139 | B1 * | 4/2021 | Tsorng ................ | H05K 7/1424 |
| 11,428,886 | B2 * | 8/2022 | Cams ................. | H02G 3/10 |
| 11,432,429 | B2 * | 8/2022 | Hinojosa .............. | H05K 7/183 |
| 11,515,695 | B1 * | 11/2022 | Barr .................. | H02G 3/083 |
| 11,608,936 | B2 * | 3/2023 | Fehr .................. | F16M 11/041 |
| 2021/0103111 | A1 | 4/2021 | Cams et al. | |
| 2022/0252811 | A1 | 8/2022 | Van Baelen et al. | |
| 2022/0260801 | A1 * | 8/2022 | Grubish .............. | G02B 6/3897 |
| 2022/0373756 | A1 * | 11/2022 | Grubish .............. | G02B 6/445 |
| 2022/0397734 | A1 | 12/2022 | Geens et al. | |

* cited by examiner

*Primary Examiner* — Bradley Duckworth
(74) *Attorney, Agent, or Firm* — McDonald Hopkins LLC (57) ABSTRACT

A modular mounting bracket includes a base member having a plurality of support members that receive an enclosure, the plurality of support members each including a plurality of slots. A plurality of latching mechanisms each including a body portion and a latching portion are positioned within the plurality of slots of the plurality of support members. The plurality of latching mechanisms are translatable between an access position and an engaged position, and the plurality of latching mechanisms engage the enclosure and secure the enclosure to the modular mounting bracket in the engaged position.

15 Claims, 11 Drawing Sheets

MODULAR MOUNTING BRACKET AND METHOD OF MOUNTING ENCLOSURES

TECHNICAL FIELD

The present specification generally relates to mounting brackets, and more specifically, to modular mounting brackets for fiber optic cable enclosures.

BACKGROUND

Fiber optic cable enclosures are commonly utilized in the telecommunications industry to protect and organize fiber optic cables. These enclosures are typically mounted to a wall, or other similar structure, utilizing a mounting bracket to secure the enclosure in a desired location. However, many traditional mounting brackets are bulky, difficult to install, and require a significant amount of tools and hardware to secure the enclosure to the mounting bracket. Accordingly, a need exists for a mounting bracket that minimizes the need for tools and hardware during installation while also allowing for easy access to the enclosure in the event the enclosure requires maintenance or other similar service.

SUMMARY

In an embodiment, a modular mounting bracket is disclosed. The modular mounting bracket includes a base member having a plurality of support members that receive an enclosure, the plurality of support members each including a plurality of slots. A plurality of latching mechanisms each including a body portion and a latching portion are positioned within the plurality of slots of the plurality of support members. The plurality of latching mechanisms are translatable between an access position and an engaged position, and the plurality of latching mechanisms engage the enclosure and secure the enclosure to the modular mounting bracket in the engaged position.

In another embodiment, a modular mounting bracket is disclosed. The modular mounting bracket includes a body member having a plurality of protrusion brackets, with each of the plurality of protrusion brackets including a at least one coupling hole. The modular mounting bracket further includes a plurality of mounting arms extending from the body member, the plurality of mounting arms including a plurality of mounting holes. The at least one coupling hole of each of the plurality of protrusion brackets are aligned with a coupling passage of a protrusion that extends from an enclosure, and a pin is inserted through the at least one coupling hole and the coupling passage of the protrusion to secure the enclosure to the modular mounting bracket.

In yet another embodiment, a method of mounting an enclosure is disclosed. The method involves manually translating a latching mechanism of a modular mounting bracket from an engaged position to an access position; aligning the enclosure with a plurality of support members positioned on the modular mounting bracket, such that a protrusion that extends from the enclosure aligns with the latching mechanism; and manually translating the latching mechanism of the modular mounting bracket from the access position to the engaged position, such that the latching mechanism secures the enclosure within the modular mounting bracket.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein relate to modular mounting brackets and methods of mounting enclosures. More specifically, the present disclosure relates to a modular mounting bracket including a base member having a plurality of support members that receive an enclosure, where each of the support members include a plurality of slots. The modular mounting brackets described herein further include a plurality of latching mechanisms each having a body portion and a latching portion, where the body portion of each of the plurality of latching mechanisms is received by the plurality of slots, and the latching portion of each of the plurality of latching mechanisms is configured to engage the enclosure. In these embodiments, the plurality of latching mechanisms are translatable between an access position and an engaged position, such that the plurality of latching mechanisms engage the enclosure in the engaged position.

As provided herein, the term "enclosure" may refer to a container or housing that is designed to protect and/or organize wires and related components. The enclosures described herein may be made of various materials, such as plastic or metal, and may have one or more openings or ports for accessing the wires inside. For example, the enclosures described herein may include a fiber optic cable enclosure, or any other similar enclosure.

As provided herein, the term "wire" may refer to a thin, flexible strand or rod of metal (e.g., copper, aluminum, etc.) used for conducting electricity and/or transmitting signals. For example, the term "wire" may include lines, cables, mono-filament wires, stranded wires, multiple/bundled cables or wires, fiber optic line(s), overhead shielded wires, conductors, optical ground wires (OPGW), and all-dielectric self-supporting fiber optic cables (ADSS). In these embodiments, the wires may be insulated or uninsulated and used for various applications, including power transmission, telecommunications, or data networking.

As provided herein, the term "manual coupling" may refer to the process of connecting two separate component or devices together by hand without the use of additional tools and/or hardware. For example, "manual coupling" may include physically engaging and/or disengaging components via sliding, twisting, snapping, or other actions that may be performed without the use of tools.

As should be appreciated, traditional enclosures, such as fiber optic cable enclosures, are often mounted on walls, aerial cables, or poles in locations where the enclosure is not readily accessible. Furthermore, traditional mounting brackets on which the enclosures are supported are often bulky, difficult to install, and require a significant amount of tools and hardware. In particular, traditional mounting brackets often utilize a number of fasteners to secure the enclosure to the mounting bracket.

It should be further noted that, in addition to complicating installation, the hardware and tools required to mount the enclosure to the mounting bracket may also cause difficulties in accessing the enclosure in the event the enclosure requires maintenance or other similar service after the enclosure is secured to the bracket. For example, accessing the enclosure may involve removing a plurality of fasteners from the enclosure, which may in turn necessitate that the user is equipped with particular tools when accessing the enclosure. In circumstances where the mounting bracket and enclosure are mounted at a high elevation (e.g., aerially, or otherwise), significant delays in service may occur when a user is not equipped with the appropriate tools and/or hardware.

In contrast, the latching mechanisms described herein may form a snap-fit, or other similar manual engagement, with protrusions that extend from a body of the enclosure. Accordingly, it may be possible for a user to secure the enclosure within the disclosed modular mounting bracket without the need for any tools or hardware. Similarly, in the event the enclosure requires maintenance or other similar service, a user may easily disengage the plurality of latching mechanisms from the enclosure, which may allow the user to access the enclosure without the need for any tools. By providing a modular mounting bracket that includes latching mechanisms which may be manually engaged with an enclosure, it may be possible to alleviate the complications and delays that often arise from servicing traditional mounting brackets and enclosure that utilize the various types of hardware and tools described herein.

Embodiments of modular mounting brackets and methods of mounting enclosures will now be described in more detail herein. The following will now describe these modular mounting brackets and methods in more detail with reference to the drawings and where like numbers refer to like structures.

Figure 1:
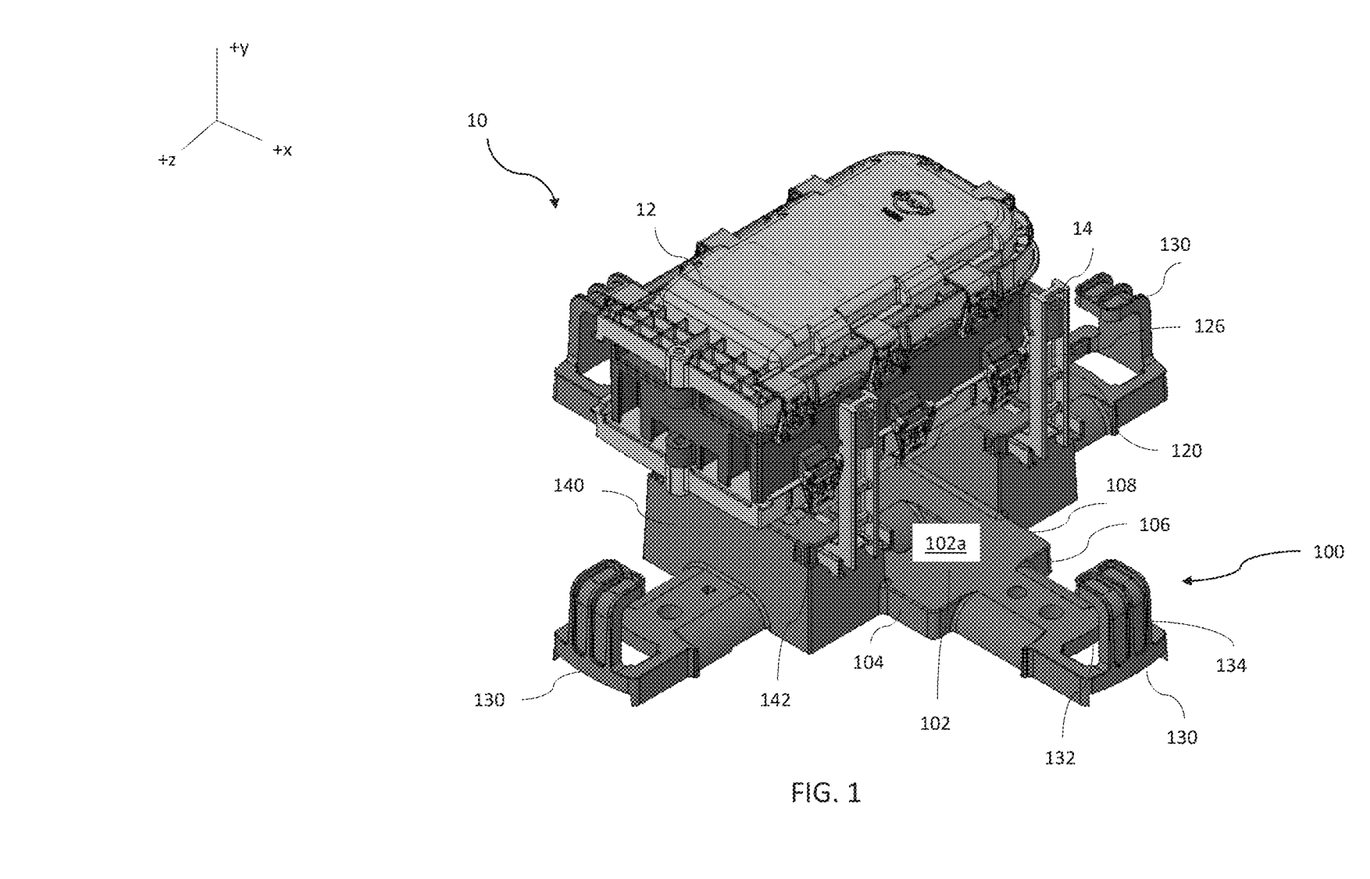
FIG. 1 depicts a perspective view of an enclosure secured to a modular mounting bracket, according to one or more embodiments shown and described herein.

Referring now to FIG. 1, a modular mounting bracket 100 for mounting an enclosure 10 is depicted. The modular mounting bracket 100 may include a base member 102 which includes a plurality of support members 140 that receive the enclosure 10. In these embodiments, a plurality of latching mechanisms 120 may be translatably coupled to the plurality of support members 140, and may be used to secure the enclosure 10 to the modular mounting bracket 100. More particularly, the plurality of latching mechanisms 120 may be capable of translating within a plurality of slots 142 formed in each of the plurality of support members 140, such that the plurality of latching mechanisms 120 may be translatable between an access position, in which the plurality of latching mechanisms 120 do not engage the enclosure 10, and an engaged position, in which the latching mechanisms 120 engage the enclosure 10. In the embodiments described herein, the base member 102 may be further configured to be mounted onto a wall, pole, aerial cable (FIG. 5) or other similar structure using a series of fasteners and/or other similar attachment mechanisms (not depicted.)

For example, the enclosure 10 may include a body 12 having a plurality of protrusions 14 that extend laterally (e.g., in the +/−x-direction as defined by the coordinate axis of FIG. 1) from the body 12 of the enclosure 10. In these embodiments, the protrusions 14 may form a snap-fit, or other similar manual coupling, with a plurality of openings 126 formed in the latching mechanisms 120. In these embodiments, the plurality of openings 126 formed in the latching mechanisms 120 may be sized and/or shaped to conform to the protrusions 14 of the enclosure such that, when the latching mechanisms 120 are translated to the engaged position, a manual coupling is achieved between the latching mechanisms 120 and the enclosure 10. Accordingly, it may be possible to secure the enclosure 10 to the modular mounting bracket 100 without the need for any hardware, tools, or other additional components. The structure and operation of the latching mechanisms 120 will be described in additional detail herein with reference to FIGS. 3A-4B.

Referring still to FIG. 1, the modular mounting bracket 100 may further include a plurality of arm members 130. In these embodiments, the plurality of arm members 130 may extend in a radially outward direction from the base member 102 of the modular mounting bracket 100, such that the plurality of arm members 130 are evenly spaced about a perimeter of the base member 102 of the modular mounting bracket 100. As further depicted in FIG. 1, the plurality of arm members 130 may each include a curved projection 134, which may be used for securing and/or storing wires (not depicted) that extend out of the enclosure 10. The plurality of arm members 130 will be described in additional detail herein with reference to FIGS. 2 and 6.

Referring now to FIGS. 2-4B, the modular mounting bracket 100 and various components of the modular mounting bracket 100 are depicted in additional detail. As most clearly illustrated in FIG. 2, the base member 102 may include a front wall 104, a rear wall 108, and a pair of sidewalls 106 that extend between the front wall 104, and the rear wall 108, respectively. In these embodiments, the front wall 104, rear wall 108, and pair of sidewalls 106 may define a central portion 102a of the modular mounting bracket 100, with the various components of the modular mounting bracket 100 extending from the central portion 102a of the base member 102. Although the base member 102 is depicted as including four walls, it should be appreciated that, in some embodiments, the base member 102 may include any number of walls (or shape), with the number of walls dictating the shape of the central portion 102a of the base member 102. For example, and without limitation, in embodiments in which the base member 102 includes four walls, the central portion 102a may have a square or rectangular shape. In contrast, a base member 102 including three walls may include a triangularly shaped central portion, while a base member 102 including eight walls may include an octagonally shaped central portion. In these embodiments, the base member 102 may include any number of walls without departing from the scope of the present disclosure, such that the number of walls of the base member 102 may be adjusted to conform with a shape of the enclosure 10 that is mounted using the modular mounting bracket 100.

Figure 2:
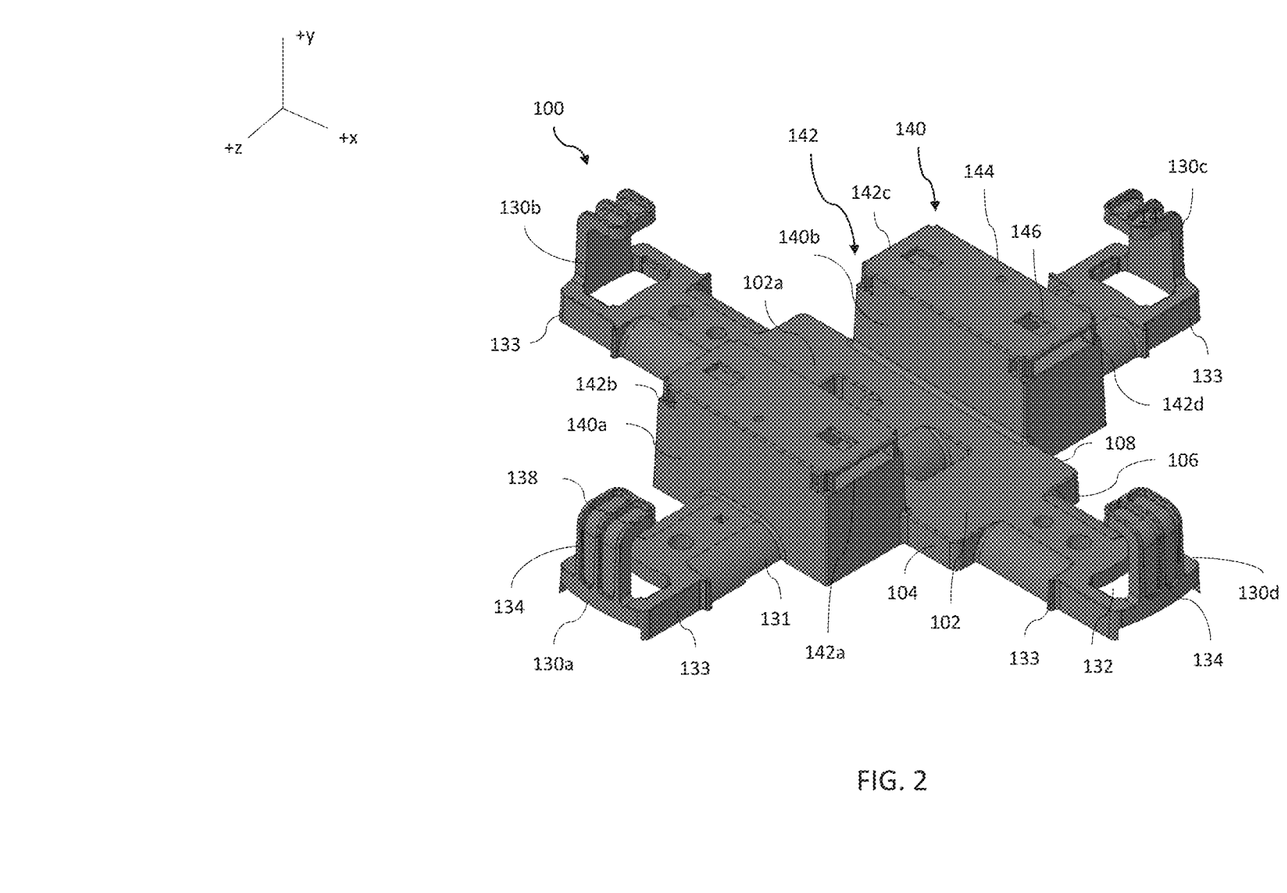
FIG. 2 depicts a perspective view of the modular mounting bracket of FIG. 1, according to one or more embodiments shown and described herein.

As further depicted in FIG. 2, the plurality of arm members 130 (e.g., a-d) may extend radially outwardly from the base member 102. While four arm members are depicted, it is to be understood that most any number of arm members can be employed or provided without departing from the spirit and/or scope of the innovation and claims appended hereto. For example, in embodiments, an arm member 130 may extend from each of the walls of the base member 102 (e.g, the front wall 104, rear wall 108, and each of the pair of sidewalls 106) such that the plurality of arm members 130 are evenly spaced about the central portion 102a of the base member 102. In these embodiments, the plurality of arm members 130 may correspond to the number of walls of the base member 102, such that each wall includes an arm member 130 extending in a radially outward direction therefrom. As depicted in FIG. 2, the plurality of arm members 130 may include four arm member 130a, 130b, 130c, 130d, with one arm member extending from each of the front wall 104, the rear wall 108, and each of the pair of sidewalls 106.

Although the modular mounting bracket 100 of FIG. 2 depicts the plurality of arm members 130 as including an arm member for each of the walls of the base member 102, it should be appreciated that the modular mounting bracket 100 may include most any number of arm members 130 without departing from the scope of the present disclosure. For example, while not shown, it is contemplated that the base member 102 may only include a first arm member and a second member that extend radially outward from the front wall 104 and the rear wall 108, respectively, while the pair of sidewalls 106 do not include an arm member 130. Thus, it should be understood that the modular mounting bracket 100 depicted in FIG. 2 is exemplary in nature and presented for illustrative purposes and not intended to limit the scope of the innovation in any way.

Referring still to FIG. 2, each of the plurality of arm members 130 may include a proximal portion 131 positioned adjacent the central portion 102a of the base member 102, and a distal portion 133 located opposite the proximal portion 131. In these embodiments, a projection, such as a curved projection 134, may be positioned on the distal portion 133 of each of the plurality of arm members 130 and may extend upwardly (e.g., in the +y-direction as depicted in the coordinate axis of FIG. 2) from the arm member 130. As further depicted in FIG. 2, the curved portion of the curved projection 134 may define a hook 138, which may be used to support and/or store wire (not depicted) that may extend from the enclosure 10.

The distal portion 133 of each of the plurality of arm members 130 may further include an aperture 132. In these embodiments, the aperture 132 of each of the plurality of arm members 130 being configured to receive an extension member, as will be described in additional detail herein with reference to FIG. 6.

Referring still to FIG. 2, the base member 102 includes a plurality of support members 140 (e.g., a-b). As illustrated in FIG. 2, each of the plurality of support members 140 may be secured over at least one of the plurality of arms 130, such that each support member 140 is positioned adjacent the central portion 102a of the base member 102 and between the distal portion 133 of the arm member 130 and the wall from which the arm member 130 extends. For example, the modular mounting bracket 100 depicted in FIG. 2 includes a first support member 140a and a second support member 140b. In these embodiments, the first support member 140a may be positioned adjacent the central portion 102a of the base member 102 and between the front wall 104 and the distal portion 133 of arm member 130a. Similarly, the second support member 140b may be positioned adjacent the central portion 102a of the base member 102 and between the rear wall 108 and the distal portion 133 of arm member 130c. In these embodiments, each of the plurality of support members 140 may extend in an upward direction relative the base member 102 (e.g., in the +y-direction as depicted in the coordinate axis of FIG. 2), such that the enclosure 10 is elevated from the central portion 102a of the base member 102 when the enclosure 10 is secured to the modular mounting bracket 100.

In the embodiments described herein, it should be noted that the base member 102, the plurality of support members 140, and the plurality of arm members 130 may be formed of separate components which are fixedly attached via fasteners and/or other similar mechanisms (e.g., friction, snap, etc.). However, in other embodiments, the base member 102, the plurality of support members 140, and the plurality of arm members 130 may be formed together, such that the modular mounting bracket 100 may be considered a single, monolithic structure.

Referring still to FIG. 2, although the modular mounting bracket 100 is depicted as including a first and second support member 140a, 140b, it should be appreciated that the modular mounting bracket 100 may include any number of support members 140a, 140b without departing from the scope of the present disclosure. For example, the modular mounting bracket 100 may include four support members, six support members, or any other number of support members required to secure the enclosure 10 to the modular mounting bracket 100. Furthermore, it should be understood that, although the first and second support members 140a, 140b are depicted as being adjacent the front wall 104 and rear wall 108, respectively, the support members may be positioned along any portion of the base member 102 without departing from the scope of the present disclosure. For example, in some embodiments, the first and second support members 140a, 140b may be positioned on each of the sidewalls 106. In other embodiments, the first and second support members 140a, 140b may be positioned on the yet front wall 104 and one of the pair of sidewalls 106. However, it should be noted that, in some embodiments, it may be advantageous for the plurality of support members 140 to be positioned oppositely of each of the other plurality of support members 140 in order to more securely mount the enclosure 10 to the modular mounting bracket 100.

Referring still to FIG. 2, each of the plurality of support members 140 may further include a plurality of slots 142 which extend at least partially through a length (e.g., in the +/−x-direction as depicted in the coordinate axis of FIG. 2) of each of the plurality of support members 140. For example, as depicted in FIG. 2, the first support member 140a may include a first slot 142a and a second slot 142b, while the second support member 140b may similarly include a pair of slots, such as a third slot 142c and a fourth slot 142d.

In these embodiments, each of the plurality of slots 142 may be positioned oppositely of another of the plurality of slots 142, with each of the plurality of slots 142 extending through the support member 140 and towards the oppositely positioned slot 142. For example, as depicted in FIG. 2, the first support member 140a includes the first slot 142a positioned oppositely of the second slot 142b, with the first slot and second slot 142a, 142b extending inwardly towards one another (e.g., the first slot 142a extends in the −x-direction while the second slot 142b extends in the +x-direction as depicted in the coordinate axis of FIG. 2).

Figure 3A:
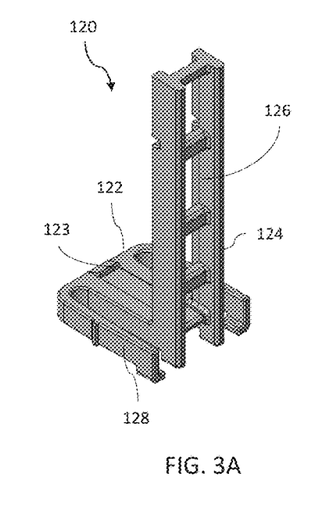
FIG. 3A depicts a perspective view of a latching mechanism for securing the enclosure of FIG. 1 to the modular mounting bracket, according to one or more embodiments shown and described herein.
Figure 3B:
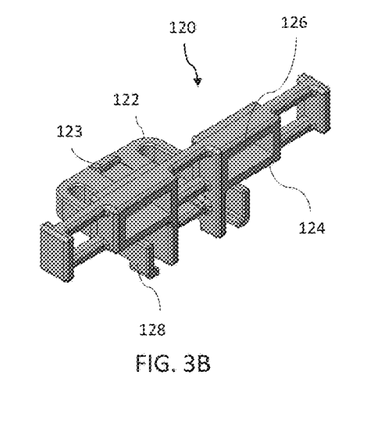
FIG. 3B depicts a perspective view of another latching mechanism for securing the enclosure of FIG. 1 to the modular mounting bracket, according to one or more embodiments shown and described herein.
Figure 3C:
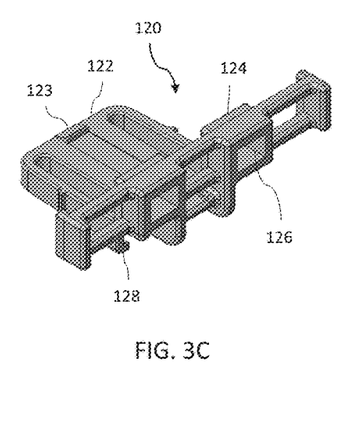
FIG. 3C depicts a perspective view of another latching mechanism for securing the enclosure of FIG. 1 to the modular mounting bracket, according to one or more embodiments shown and described herein.
Figure 3D:
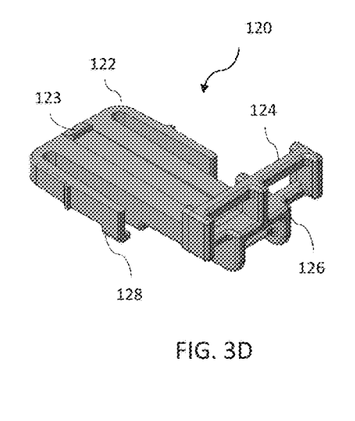
FIG. 3D depicts a perspective view of another latching mechanism for securing the enclosure of FIG. 1 to the modular mounting bracket, according to one or more embodiments shown and described herein.

Referring now to FIGS. 2-3D, the plurality of slots 142 may be configured to receive the plurality of latching mechanisms 120. In these embodiments, the plurality of slots 142 of each of the plurality of support members 140 may be sized and shaped such that the plurality of latching mechanisms 120 (examples as illustrated in FIGS. 3A-3D) may be slidably engaged within the plurality of slots 142. For example, once the plurality of latching mechanisms 120 are inserted into the plurality of slots 142, the plurality of latching mechanisms 120 may each translate in a longitudinal direction (e.g., in the +/−x-direction as depicted in the coordinate axis of FIG. 2) between the access position and the engaged position, as will be described in additional detail herein in reference to FIGS. 4A-4B. However, the plurality of latching mechanisms 120 may be prevented from moving in a medial direction (e.g., +/−y-direction as depicted in the coordinate axis of FIG. 2), or in a lateral direction (e.g., in the +/−z-direction as depicted in the coordinate axis of FIG. 2).

Referring still to FIGS. 2-3D, a top surface 144 of each of the plurality of support members 140 may include a notch 146, which may extend through the top surface 144 of each of the plurality of support members 140 and into each of the plurality of slots 142. In these embodiments, the notch 146 in each of the plurality of slots 142 may define a distance that each of the plurality of latching mechanisms 120 are able to translate in the longitudinal direction (e.g., between the access position and the engaged position) as will be described in additional detail herein with reference to FIGS. 4A-4B.

As noted hereinabove, the plurality of latching mechanism 120 are most clearly depicted in FIGS. 3A-3D. As illustrated in FIGS. 3A-3D, each of the plurality of latching mechanisms 120 may include a body portion 122, which may be configured to engage the plurality of slots 142 of the support members 140, and a latching portion 124, which may be configured to engage the protrusions 14 that extend from the enclosure 10, as shown in FIG. 1.

Referring now to FIGS. 3A-4B, the body portion 122 of the plurality of latching mechanisms 120 may include a detent 123, or other similar mechanism, that may be used to secure the latching mechanism 120 within its respective slot 142. In these embodiments, the detent 123 may be depressed, or otherwise deformed, to insert the latching mechanism 120 within its respective slot 142. As the latching mechanism 120 is inserted into the slot 142, the slot 142 may compress the detent 123 until the detent 123 is aligned with the notch 146 formed in the slot 142. As the detent 123 is aligned with the notch, the detent 123 may automatically raise (e.g., in the +y-direction as depicted in the coordinate axes of FIGS. 3A-3D) into and through the notch 146. Once the detent 123 has engaged the notch 146, the detent 123 may allow the latching mechanism 120 to be translated longitudinally (e.g., in the +/−x-direction as depicted in the coordinate axes of FIGS. 4A-4B), but may prevent the latching mechanism 120 from being fully removed from the slot 142. For example, when the latching mechanism 120 is moved from the engaged position to the access position, the detent 123 may engage the notch 146 of the slot 142 to ensure that the latching mechanism 120 is not removed from the support member 140.

Referring still to FIGS. 3A-4B, the body portion 122 of the plurality of latching mechanisms 120 may further include a plurality of flanges 128. In these embodiments, the plurality of flanges 128 may be similarly compressed (e.g., in the +/−z-direction as depicted in the coordinate axes of FIGS. 3A-3D) in order to insert the body portion 122 of the plurality of latching mechanisms 120 into their respective slots 142. As should be appreciated in view of the foregoing, the plurality of flanges 128 of the body portions 122 of the plurality of latching mechanisms 120 may further act to secure the plurality of latching mechanisms in the access position and the engaged position, respectively, as will be described in additional detail herein with specific reference to FIGS. 4A-4B.

As further depicted in FIGS. 3A-3D, each of the plurality of latching mechanisms 120 further include a latching portion 124 that engages the enclosure 10. In these embodiments, the latching portion 124 of each of the plurality of latching mechanisms 120 may further include a plurality of openings 126, which may engage the protrusions that extend from the enclosure.

In these embodiments, the latching portion 124 of each of the plurality of latching mechanisms 120 may be oriented to align with the enclosure that is secured to the modular mounting bracket. For example, in some embodiments, the latching portion 124 may extend perpendicularly relative to the enclosure (e.g., in the +/−y-direction as depicted in the coordinate axes of FIGS. 3A-3D) such that the latching portion 124 is capable of engaging a variety of enclosures having protrusions positioned at varying heights (FIG. 3A). In other embodiments, the latching portion 124 may extend in a lateral direction (e.g., in the +/−z-direction as depicted in the coordinate axes of FIGS. 3A-3D), such that the latching portion 124 is capable of engaging a variety of enclosures having protrusions at varying positions along a length of the enclosure (FIGS. 3B-3D).

Referring still to FIGS. 3A-3D, it should be further appreciated that the plurality of openings 126 of the latching portions 124 of the latching mechanisms 120 may take any size and shape corresponding to the protrusions of the enclosure. For example, the plurality of openings 126 may have a rectangular shape (FIGS. 3A-3B and 3D) or a combination of square and rectangular shapes (FIG. 3C). Furthermore, the latching portions 124 of the latching mechanisms 120 may include any number of openings 126 necessary to accommodate a desired variety of enclosures. For example, the latching portions 124 may include one opening, two openings, three openings, or any other number of openings without departing from the scope of the present disclosure.

It is to be understood an appreciated that the latching mechanisms 120 in the series of figures are provided as examples of the features, functions and benefits of the innovation. These examples are not to be construed as limiting the scope of the innovation as described and/or claims herein. Further, like numerals are used to describe items having similar function but often differing configurations.

Figure 4A:
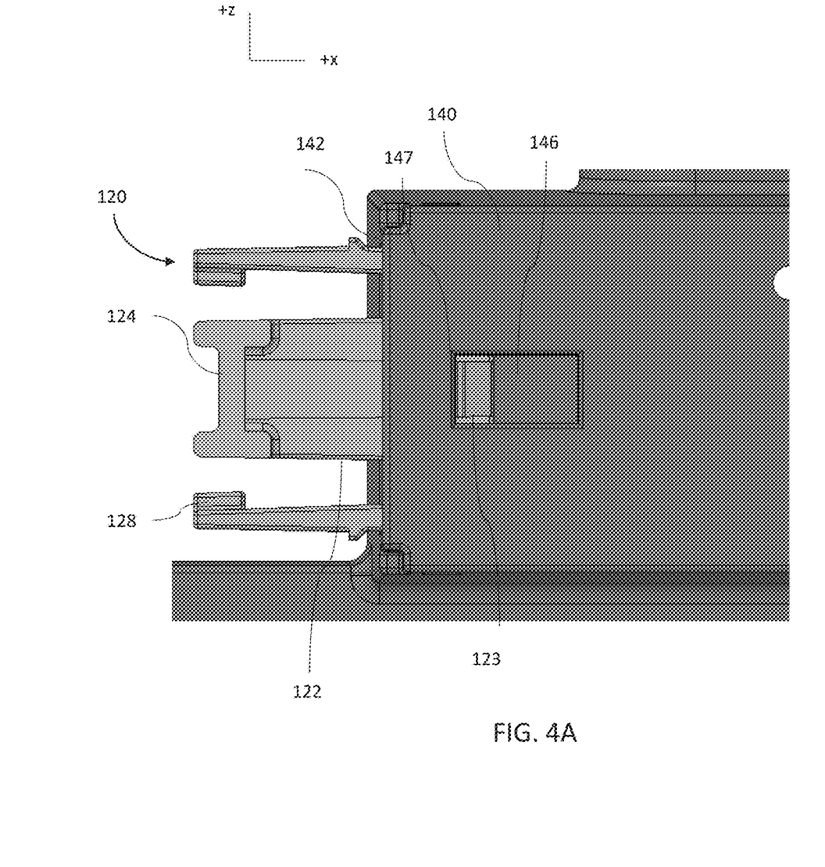
FIG. 4A depicts a top-side view of the latching mechanism of FIGS. 3A-3D in an access position, according to one or more embodiments shown and described herein.
Figure 4B:
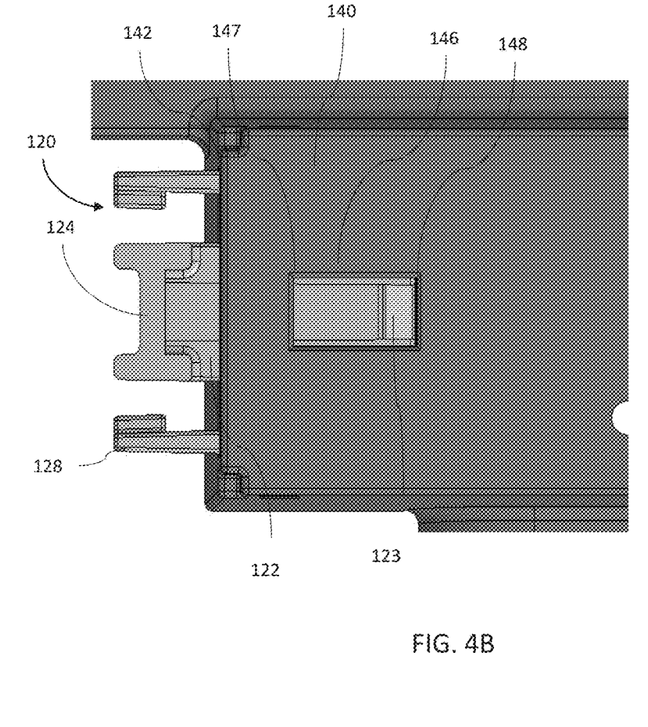
FIG. 4B depicts a top-side view of the latching mechanism of FIG. 4A in an engaged position, according to one or more embodiments shown and described herein.

Turning now to FIGS. 4A and 4B, a top side view of an example latching mechanism 120 is depicted as being engaged within a slot 142 of an example support member 140 as the latching mechanism 120 is translated between the access position (FIG. 4A) and the engaged position (FIG. 4B).

As depicted in FIG. 4A, the latching mechanism 120 is illustrated in the access position. In these embodiments, the detent 123 may contact a first surface 147 of the notch 146 formed in the slot 142, and the plurality of flanges 128 of the body portion 122 of the latching mechanism 120 may extend from the slot 142, such that the flanges 128 are not compressed by the slot 142. In the access position, the latching portion 124 of the latching mechanism 120 may be positioned away from the protrusions of the enclosure, such that the latching portion 124 is disengaged from the enclosure. Accordingly, a user may access (e.g., open, etc.) the enclosure mounted on the modular mounting bracket 100 when the latching mechanism 120 is in the access position, such that a user may perform maintenance or other similar service on the enclosure without adjusting and/or manipulating other components of the modular mounting bracket 100.

Turning now to FIG. 4B, the latching mechanism 120 is depicted in the engaged position. In these embodiments, the body portion 122 of the latching mechanism 120 may be translated in the longitudinal direction (e.g., in the +x-direction as depicted in the coordinate axes of FIGS. 4A-4B) into the slot 142 such that the detent 123 of the latching mechanism 120 translates to contact a second surface 148 of the notch 146 formed in the slot 142. As the body portion 122 moves in the longitudinal direction, the latching portion 124 may similarly translate in the longitudinal direction towards the enclosure, such that the plurality of openings of the latching mechanism 120 engage the protrusions that extend from the enclosure.

In these embodiments, the force generated by translating the latching mechanism 120 from the access position to the engaged position may be sufficient to cause the plurality of openings to form a manual coupling, such as a snap-fit, with the protrusions that extend from the enclosure. Accordingly, a user may secure the enclosure within the modular mounting bracket 100 without the use of any additional tools and/or hardware by manually shifting the latching mechanisms 120 from the access position to the engaged position.

Although the latching mechanisms 120 described herein are depicted as forming a snap-fit with the protrusions of the enclosure, it should be appreciated that any manual coupling may be formed between the latching mechanisms 120 and the protrusions of the enclosure without departing from the scope of the present disclosure. For example, the protrusion may be press-fit into the openings of the latching member with enough tension to hold the enclosure securely in place. Similarly, the latching mechanism may be held in place by friction, with a slight interference fit existing between the openings of the latching mechanism and the protrusions of the enclosure. In other embodiments, a wedge-fit may be formed between the latching mechanism and the enclosure. For example, in these embodiments, the latching portions of the latching mechanism may be rotatably coupled to the body portion of the latching mechanism, such that the latching mechanism may be coupled to the protrusions of the enclosure at an angle and twisted into position. In further embodiments still, the latching mechanism and the enclosure may form a magnetic fit (e.g., a fit which utilizes magnets to attract the latching mechanism to the enclosure) and/or a cam-lock fit (e.g., a fit which utilizes a cam disposed on the latching mechanism and a complementary cam on the enclosure). It should be noted that the examples provided herein are illustrative in nature and are not intended to be exhaustive.

Figure 5:
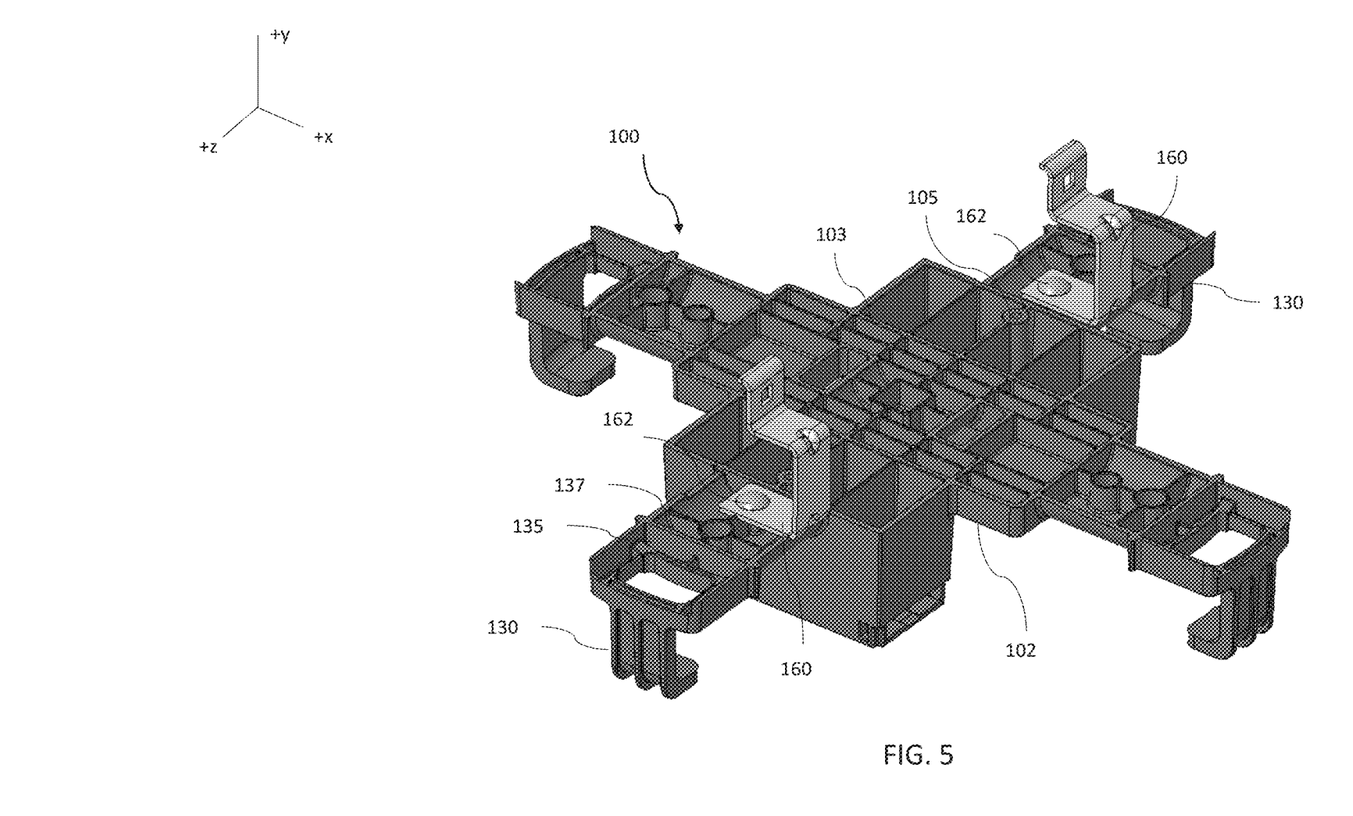
FIG. 5 depicts a bottom-side perspective view of the modular mounting bracket of FIG. 1, according to one or more embodiments shown and described herein.

Turning now to FIG. 5, a bottom-side view of the modular mounting bracket 100 is depicted. In these embodiments, each of the plurality of arm members 130 may include a bottom surface 135 that includes a plurality of mounting holes 137, such as carriage holes, that may be configured to receive a hanger bracket 160. In these embodiments, the hanger brackets 160 may secured to at least one of the plurality of mounting holes 137 by way of a fastener 162, or other similar device, and may allow for the modular mounting bracket 100 to be suspended from a cable, such as an aerial cable, or other similar structure.

Referring still to FIG. 5, it should be noted that the base member 102 may further include a bottom surface 103 having a second plurality of mounting holes 105. In these embodiments, the second plurality of mounting holes 105 may be similarly configured to receive the hanger bracket 160. Accordingly, a user may secure the hanger bracket 160 to either the plurality of arm members 130 or the base member 102 of the modular mounting bracket 100 in order to mount the modular mounting bracket 100 to a cable, as has been described herein.

Figure 6:
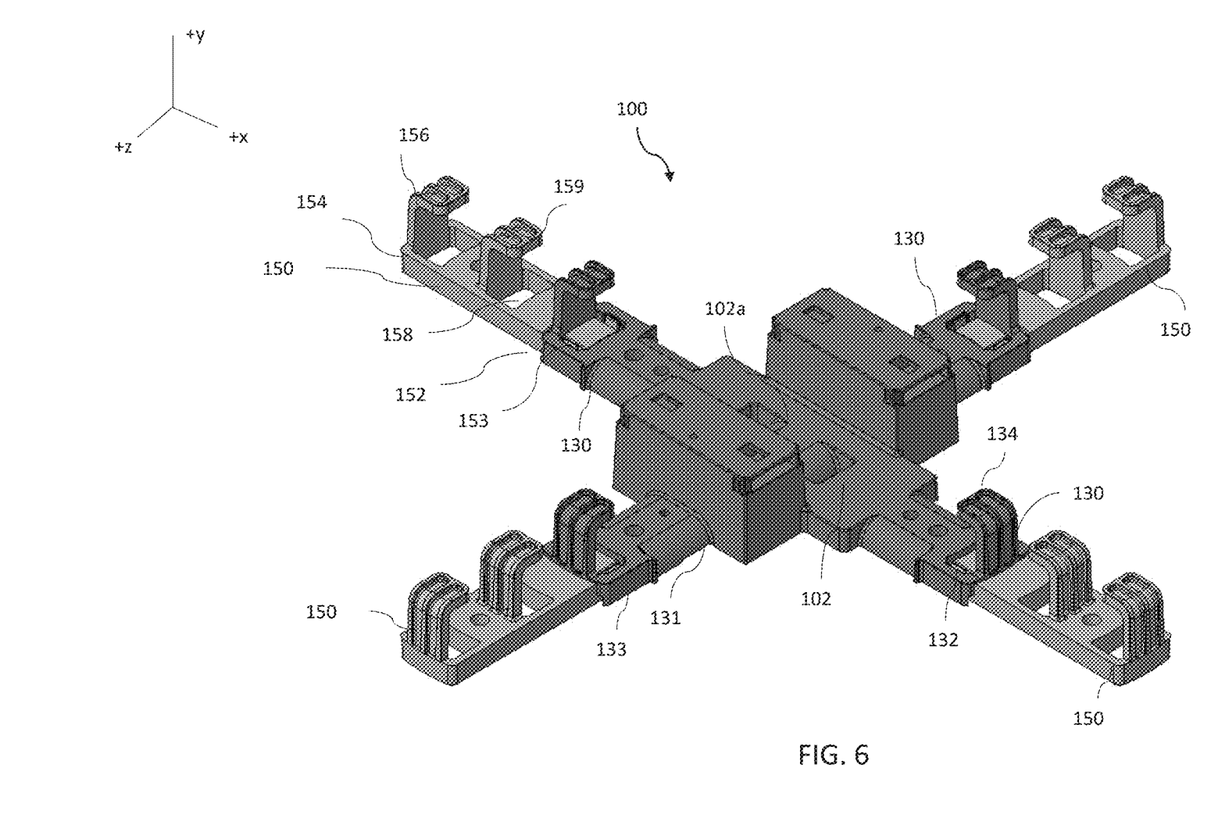
FIG. 6 depicts a perspective view of the modular mounting bracket of FIG. 1 further including a plurality of extension members, according to one or more embodiments shown and described herein.

Turning now to FIG. 6, the modular mounting bracket is depicted including a plurality of extension members 150. In these embodiments, the plurality of extension members 150 may be structurally similar to each of the plurality of arm members 130, and may act to increase the wire storage capability of the modular mounting bracket 100.

As further depicted in FIG. 6, each of the plurality of extension members 150 may include a first end 152 having a clipping mechanism 153 which may engage the aperture 132 positioned on the distal portion 133 of each of the plurality of arm members 130. When the clipping mechanism 153 of the extension member 150 engages the aperture of one of the plurality of arm members 130, the extension member 150 may extend radially outward from the arm member 130 in the same direction that the arm member 130 extends from the base member 102 of the modular mounting bracket 100.

The plurality of extension members 150 may further include a second end 154 positioned opposite of the first end 152 and including at least one curved projection 156 and at least one aperture 158. In these embodiments, each of the at least one curved projections 156 may define a hook 159, which may be used to secure and/or store wires that extend from the enclosure when the enclosure is mounted to the modular mounting bracket 100. Furthermore, the at least one aperture 158 of each of the plurality of extension members 150 may allow for additional extension members 150 to be secured to the modular mounting bracket 100. For example, although FIG. 6 depicts each of the plurality of arm members 130 as engaging a single extension member 150, it should be appreciated that each of the plurality of arm members 130 may include any number of extension members, such as two extension members or three extension members, without departing from the scope of the present disclosure.

Furthermore, although each of the plurality of arm members 130 is depicted as engaging one of the plurality of extension members 150, it should be appreciated that, in some embodiments, only some of the plurality of arm members 130 may include an extension member 150. For example, in some embodiments, only the arm members 130 that extend from the front wall 104 and the rear wall 108 may include an extension member 150. Accordingly, it should be appreciated that the extension members 150 may be coupled to any number of the plurality of arm members 130 without departing from the scope of the present disclosure.

Turning now to FIGS. 7-10B, an alternative embodiment of a modular mounting bracket 200' is depicted. In these embodiments, the modular mounting bracket 200' may include a body member 210, which may be coupled to the protrusions 14 of the enclosure 10, and a plurality of mounting arms 220. The plurality of mounting arms 220 may be affixed to the body member 210 of the modular mounting bracket 200' in a variety of orientations, as will be described in additional detail herein, such that the enclosure 10 may be mounted to a wall, pole, or other similar structure in a number of directions. For example, the orientation of the plurality of mounting arms 220 may allow for the enclosure 10 to be mounted in parallel to the wall, pole, or other similar structure to which the enclosure 10 is mounted, or in parallel to a surface adjacent the structure (e.g., ground, etc.).

As further depicted in FIGS. 7-10B, the body member 210 of the modular mounting bracket 200' may include a plurality of protrusion brackets 212, such as U-shaped protrusions brackets, that may engage the protrusions 12 which extend from the enclosure 10. In these embodiments, each of the plurality of protrusion brackets 212 may include coupling holes 214, which may align with a coupling passage 16 formed in each of the protrusions 14 of the enclosure. To secure the enclosure 10 to the modular mounting bracket 200', the coupling holes 214 of the plurality of protrusions brackets 212 may be aligned with the coupling passages 16 of each of the protrusions 14 of the enclosure 10. Once the coupling holes 214 and the coupling passages 16 are aligned, a pin (not depicted), or other similar component may be manually inserted through the coupling holes 214 and coupling passages 16 of each of the plurality of protrusion brackets 212 and protrusions 14 to fix the modular mounting bracket 200' to the enclosure 10.

Referring still to FIGS. 7-10B, once the enclosure 10 is secured to the modular mounting bracket 200', the plurality of mounting arms 220 may be used to secure the enclosure 10 to a wall, pole, or other similar structure in a desired direction. As depicted most clearly in FIGS. 10A-10B, the mounting arms 220 may be s-shaped body 222, with a plurality of mounting holes 224 disposed along the s-shaped body 222. Because the plurality of mounting holes 224 are positioned on multiple planes across the s-shaped body 222, the plurality of mounting holes 224 that are fastened to the wall, pole, or other similar structure may determine the direction in which the enclosure 10 is mounted.

Figure 7:
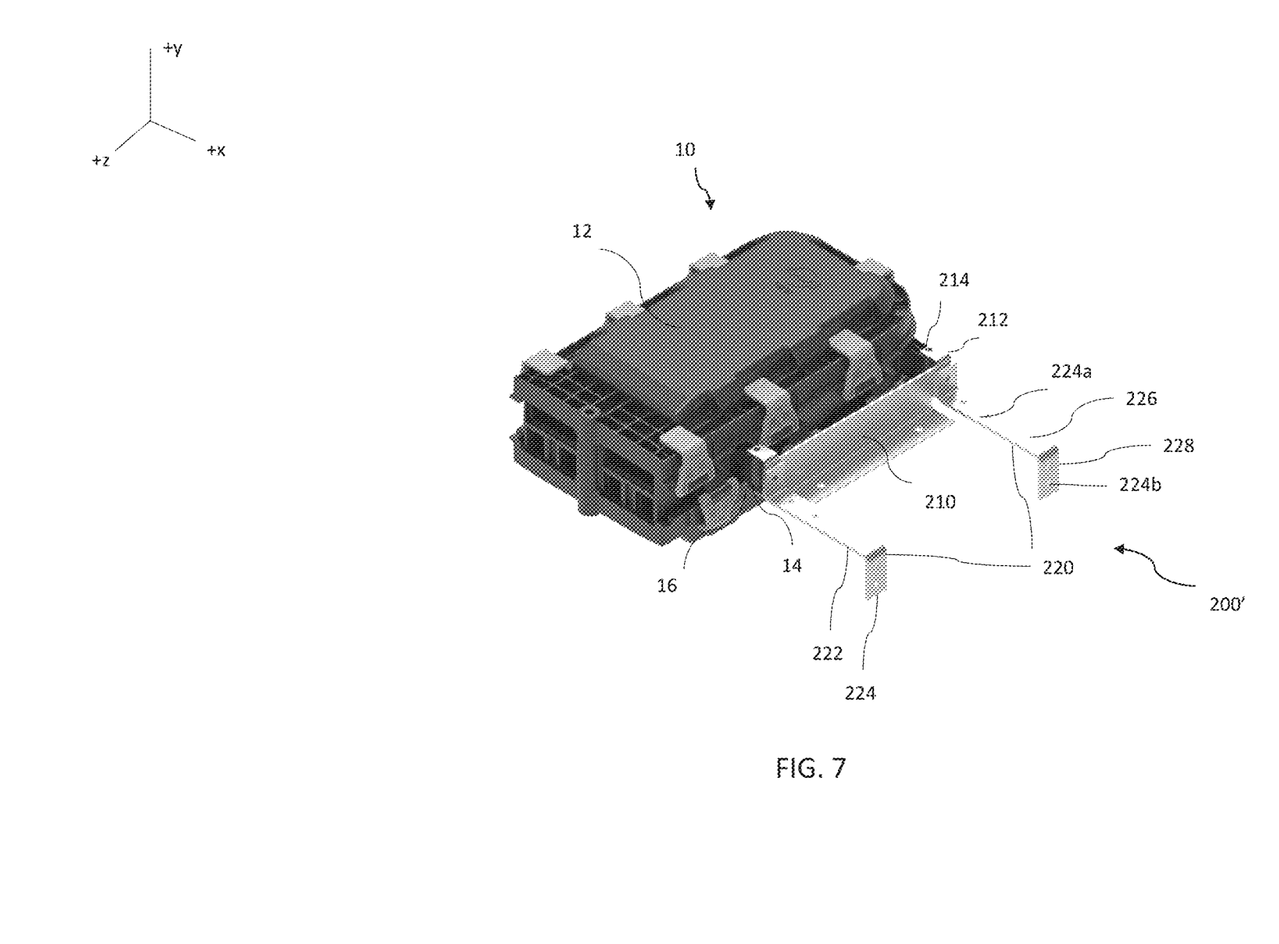
FIG. 7 depicts a perspective view of an enclosure secured to an alternate embodiment of the modular mounting bracket of FIG. 1, according to one or more embodiments shown and described herein.
Figure 8:
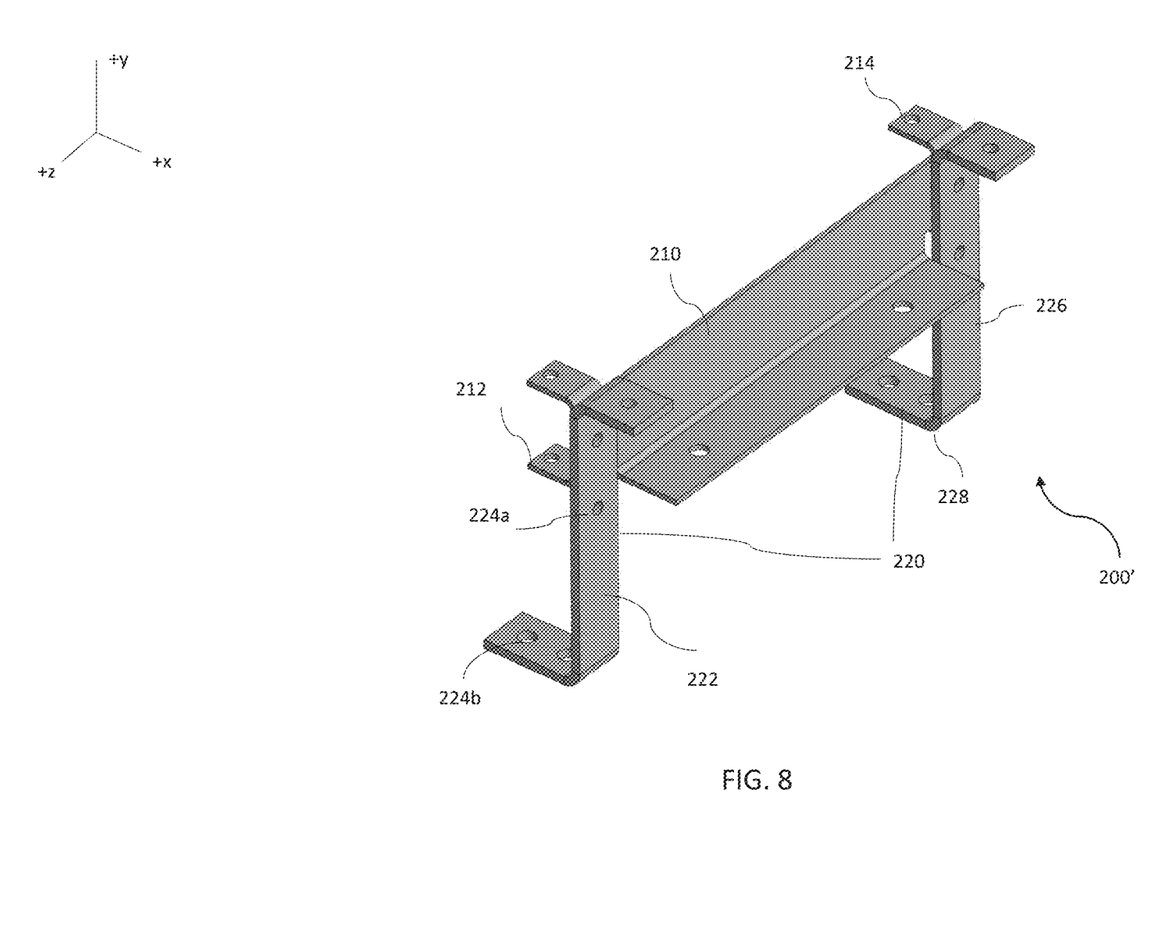
FIG. 8 depicts a perspective view of the modular mounting bracket of FIG. 7, according to one or more embodiments shown and described herein.
Figure 9:
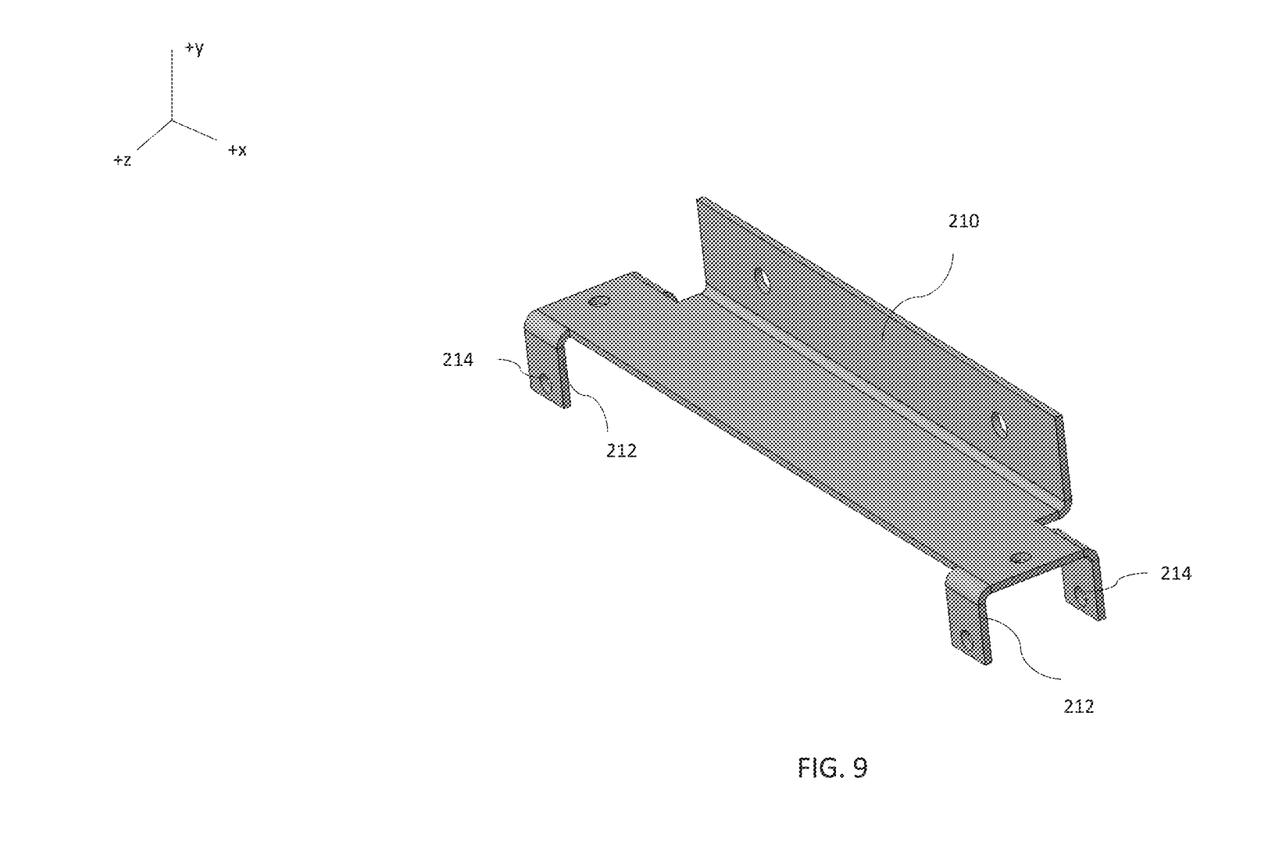
FIG. 9 depicts a perspective view of a body member of the modular mounting bracket of FIG. 7, according to one or more embodiments shown and described herein.
Figure 10A:
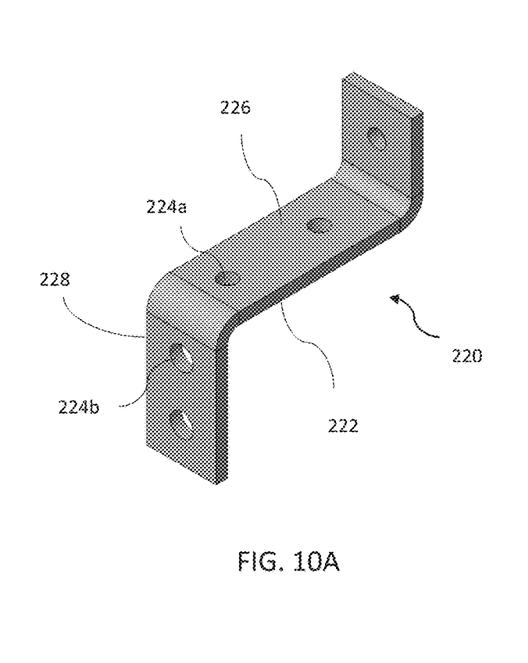
FIG. 10A depicts a perspective view of a mounting arm of the modular mounting bracket of FIG. 7, according to one or more embodiments shown and described herein.
Figure 10B:
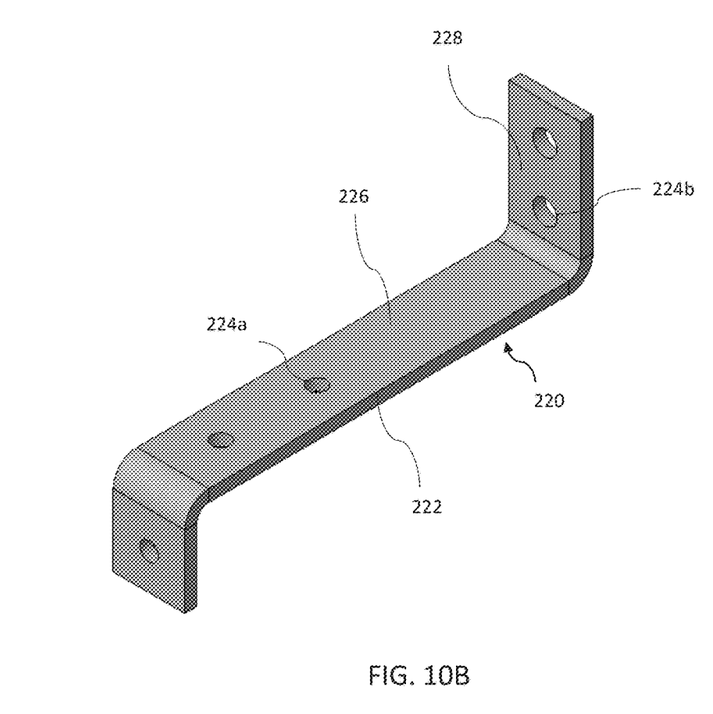
FIG. 10B depicts a perspective view of another embodiment of a mounting arm of the modular mounting bracket of FIG. 7, according to one or more embodiments shown and described herein.

For example, as depicted in FIG. 7, the s-shaped body 222 of each of the plurality of mounting arms 220 may include a central portion 226 having a first plurality of mounting holes 224a and an angled portion 228 having a second plurality of mounting holes 224b. As further depicted in FIG. 7, the angled portion 228 may be positioned at a right angle (e.g., 90 degrees) relative to the central portion 226, such that the body 222 is s-shaped. However, it should be further appreciated that the angled portion 228 may be positioned at any angle relative to the central portion 226 without departing from the scope of the present disclosure.

In these embodiments, a user may fasten the modular mounting bracket 200' to a wall, pole, or other similar structure using either the first plurality of mounting holes 224a or the second plurality of mounting holes 224b. As has been described herein, it should be appreciated that the first and second plurality of mounting holes 224a, 224b may be used to fasten the modular mounting bracket 200' to a structure such that the enclosure 10 is oriented in a variety of directions. For example, as depicted in FIG. 7, fastening the modular mounting bracket 200' to the structure utilizing second plurality of mounting holes 224b may result in the enclosure 10 extending perpendicularly from the structure, such that the enclosure 10 is in parallel with a surface adjacent the structure (e.g., ground, etc.). However, it may be possible to rotate the enclosure 10 by utilizing the first plurality of mounting holes 224a to secure the modular mounting bracket 200' to the structure, such that the enclosure 10 is aligned in parallel with the structure to which it is mounted.

Figure 11:
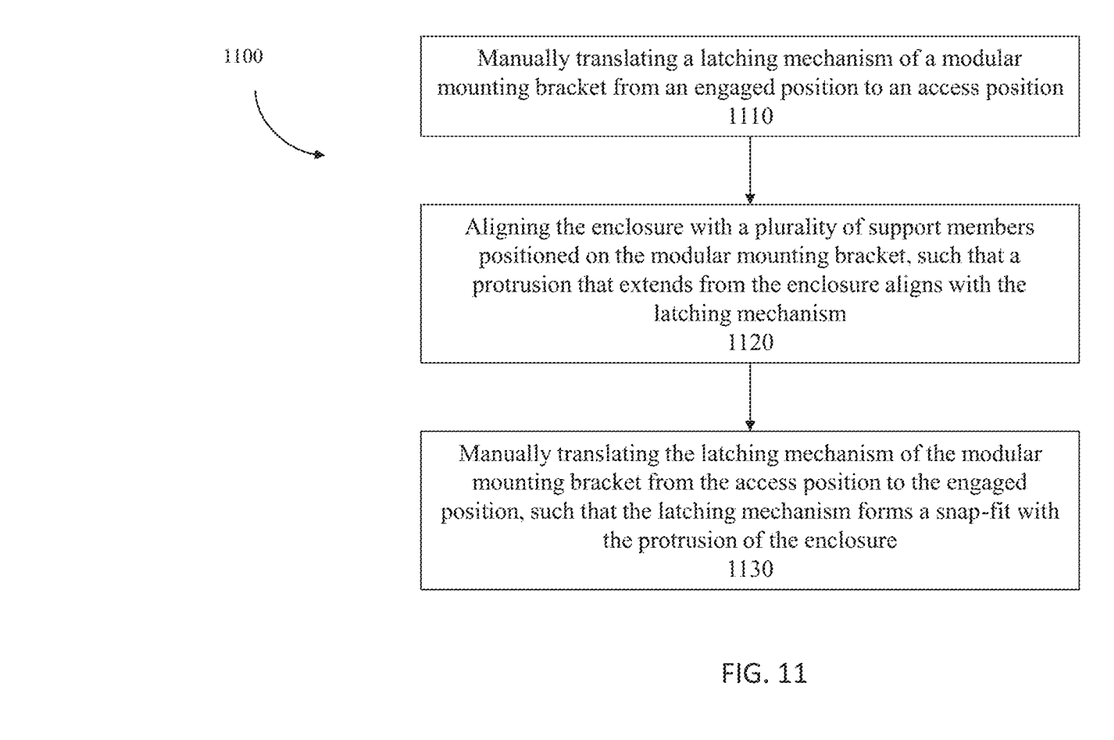
FIG. 11 depicts an illustrative flow diagram of a method of mounting an enclosure to a modular mounting bracket, according to one or more embodiments shown and described herein.

Referring now to FIG. 11, an illustrative flow diagram of a method 1100 for mounting an enclosure is disclosed. As depicted at block 1110, the method 1100 may first involve manually translating a latching mechanism of a modular mounting bracket from an engaged position to an access position. In these embodiments, translating the latching mechanism from the engaged position to the access position may allow for the enclosure to be positioned above a central portion of a base member of the modular mounting bracket, such that the enclosure may be received by the modular mounting bracket.

Once the latching mechanisms have been translated to the access position, the method moves to block 1120, which involves aligning the enclosure with the plurality of support members positioned on the modular mounting bracket. In these embodiments, aligning the enclosure with the plurality of support members may further involve aligning a protrusion that extends from the enclosure with the latching mechanism, such that, when the latching mechanism is translated to the engaged position, the latching mechanism contacts the protrusion of the enclosure.

Referring still to FIG. 11, with the enclosure appropriately aligned, the method may move to block 1130, which involves manually translating the latching mechanism of the modular mounting bracket from the access position to the engaged position to secure the enclosure within the modular mounting bracket. In these embodiments, the force of manually translating the latching mechanism from the access position to the engaged position (e.g., towards the protrusion of the enclosure) may cause the latching mechanism to form a snap-fit with the protrusion of the enclosure. Although the embodiments described herein contemplate forming a snap-fit between the latching mechanism and the enclosure, it should be appreciated that any manual coupling may be formed between the latching mechanism and the enclosure without departing from the scope of the present disclosure, as has been described herein.

As should be appreciated in view of the foregoing, a modular mounting bracket for mounting an enclosure is disclosed herein. The modular mounting bracket includes a plurality of latching mechanisms having a body portion and a latching portion, with the latching portion of each of the plurality of latching mechanisms including a plurality of openings. The plurality latching mechanisms may be translatable between an access position and an engaged position, in which the plurality of openings formed on the latching portion of each of the plurality of latching mechanisms form a manual coupling, such as a snap-fit, with a plurality of protrusions that extend from the enclosure. By utilizing a manual coupling to secure the enclosure within the modular mounting bracket, it may be possible to alleviate the need for tools and other hardware that render traditional mounting brackets difficult to install.

Further aspects of the embodiments described herein are provided by the subject matter of the following clauses:

Clause 1. A modular mounting bracket comprising: a base member comprising a plurality of support members that receive an enclosure, the plurality of support members each including a plurality of slots; and a plurality of latching mechanisms each including a body portion and a latching portion, the body portion of each of the plurality of latching mechanisms being received by the plurality of slots of the plurality of support members; wherein the plurality of latching mechanisms are translatable between an access position and an engaged position, such that the plurality of latching mechanisms engage the enclosure and secure the enclosure to the modular mounting bracket in the engaged position.

Clause 2. The modular mounting bracket of clause 1, wherein the latching portion of each of the plurality of latching mechanisms includes a plurality of openings.

Clause 3. The modular mounting bracket of clause 1 or 2, wherein the plurality of openings of each latching portion are configured to receive a protrusion that extends from the enclosure.

Clause 4. The modular mounting bracket of any of clauses 1-3, further comprising a plurality of arm members that extend radially from the base member, wherein the plurality of arm members further include a curved projection positioned at a distal end of each of the plurality of arm members, the curved projection of each of the plurality of arm members being configured to receive a wire that extends from the enclosure.

Clause 5. The modular mounting bracket of any of clauses 1-4, wherein the plurality of arm members further comprise an aperture positioned on a distal end each of the plurality of arm members.

Clause 6. The modular mounting bracket of any of clauses 1-5, further comprising a plurality of extension members coupled to the aperture positioned on the distal end of each of the plurality of arm members.

Clause 7. The modular mounting bracket of any of clauses 1-6, wherein the plurality of extension members extend radially outward from the base member and the plurality of arm members.

Clause 8. The modular mounting bracket of any of clauses 1-7, further including a plurality of extension members coupled to the plurality of arm members.

Clause 9. The modular mounting bracket of any of clauses 1-8, wherein each of the plurality of extension members further comprise an aperture and a curved projection positioned on a distal end of each of the plurality of extension members.

Clause 10. The modular mounting bracket of any of clauses 1-9, wherein the latching portion of each of the plurality of latching mechanisms extends perpendicularly to the enclosure when the enclosure is positioned on the plurality of support members.

Clause 11. The modular mounting bracket of any of clauses 1-10, wherein the latching portion of each of the plurality of latching mechanisms extends in a lateral direction relative to the enclosure when the enclosure is positioned on the plurality of support members.

Clause 12. The modular mounting bracket of any of clauses 1-11, wherein the latching portion of each of the plurality of latching mechanisms forms a snap-fit with the enclosure when the latching portion is in the engaged position.

Clause 13. The modular mounting bracket of any of clauses 1-12, wherein the body portion of each of the plurality of latching mechanisms further includes a detent that secures each of the plurality of latching mechanisms within each of the plurality of slots.

Clause 14. A modular mounting bracket comprising: a body member having a plurality of protrusion brackets, each of the plurality of protrusion brackets including at least one coupling hole; and a plurality of mounting arms extending from the body member, the plurality of mounting arms including a plurality of mounting holes; wherein the at least one coupling hole of each of the plurality of protrusion brackets are aligned with a coupling passage of a protrusion that extends from an enclosure, and a pin is inserted through the at least one coupling hole and the coupling passage of the protrusion to secure the enclosure to the modular mounting bracket.

Clause 15. The modular mounting bracket of clause 14, wherein the plurality of mounting holes include a first plurality of mounting holes and a second plurality of mounting holes, the first plurality of mounting holes and the second plurality of mounting holes being positioned on different planes.

Clause 16. The modular mounting bracket of clause 14 or 15, wherein each of the plurality of mounting arms include an s-shaped body.

Clause 17. A method of mounting an enclosure comprising: manually translating a latching mechanism of a modular mounting bracket from an engaged position to an access position; aligning the enclosure with a plurality of support members positioned on the modular mounting bracket, such that a protrusion that extends from the enclosure aligns with the latching mechanism; and manually translating the latching mechanism of the modular mounting bracket from the access position to the engaged position, such that the latching mechanism secures the enclosure within the modular mounting bracket.

Clause 18. The method of clause 17, further comprising securing a base member of the modular mounting bracket to a wall or pole.

Clause 19. The method of clause 17 or 18, further comprising securing the modular mounting bracket to an aerial cable using a hanger bracket disposed on a bottom surface of at least one of a plurality of arms coupled to the modular mounting bracket.

Clause 20. The method of any of clauses 17-19, further comprising securing a plurality of extension members to a plurality of arms that extend radially outward from a base member of the modular mounting bracket.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modular mounting bracket comprising:
a base member comprising a plurality of support members that receive an enclosure, the plurality of support members each including a plurality of slots; and
a plurality of latching mechanisms each including a body portion and a latching portion, the body portion of each of the plurality of latching mechanisms being received by the plurality of slots of the plurality of support members;
wherein the plurality of latching mechanisms are translatable between an access position and an engaged position defined by a notch formed in each of the plurality of slots, such that the plurality of latching mechanisms engage the enclosure and secure the enclosure to the modular mounting bracket in the engaged position.

2. The modular mounting bracket of claim 1, wherein the latching portion of each of the plurality of latching mechanisms includes a plurality of openings.

3. The modular mounting bracket of claim 2, wherein the plurality of openings of each latching portion are configured to receive a protrusion that extends from the enclosure.

4. The modular mounting bracket of claim 1, further comprising a plurality of arm members that extend radially from the base member, wherein the plurality of arm members include a curved projection positioned at a distal end of each of the plurality of arm members, the curved projection of each of the plurality of arm members being configured to receive a wire that extends from the enclosure.

5. The modular mounting bracket of claim 4, wherein the plurality of arm members further comprise an aperture positioned on a distal end each of the plurality of arm members.

6. The modular mounting bracket of claim 5, further comprising a plurality of extension members coupled to the aperture positioned on the distal end of each of the plurality of arm members.

7. The modular mounting bracket of claim 6, wherein the plurality of extension members extend radially outward from the base member and the plurality of arm members.

8. The modular mounting bracket of claim 4, further including a plurality of extension members coupled to the plurality of arm members.

9. The modular mounting bracket of claim 8, wherein each of the plurality of extension members further comprise an aperture and a curved projection positioned on a distal end of each of the plurality of extension members.

10. The modular mounting bracket of claim 1, wherein the latching portion of each of the plurality of latching mechanisms extends perpendicularly to a longitudinal axis of the enclosure when the enclosure is positioned on the plurality of support members.

11. The modular mounting bracket of claim 1, wherein the latching portion of each of the plurality of latching mechanisms extends in a lateral direction relative to the enclosure when the enclosure is positioned on the plurality of support members.

12. The modular mounting bracket of claim 1, wherein the latching portion of each of the plurality of latching mechanisms forms a snap-fit with the enclosure when the latching portion is in the engaged position.

13. The modular mounting bracket of claim 1, wherein the body portion of each of the plurality of latching mechanisms further includes a detent that secures each of the plurality of latching mechanisms within each of the plurality of slots.

14. A modular mounting bracket comprising:
a body member having a plurality of protrusion brackets, each of the plurality of protrusion brackets including at least one coupling hole; and
a plurality of mounting arms extending from the body member, the plurality of mounting arms including a plurality of mounting holes, the plurality of mounting holes including a first plurality of mounting holes and a second plurality of mounting holes, the first plurality of mounting holes and the second plurality of mounting holes being non-planar;
wherein the at least one coupling hole of each of the plurality of protrusion brackets are aligned with a coupling passage of a protrusion that extends from an enclosure, and a pin is inserted through the at least one coupling hole and the coupling passage of the protrusion to secure the enclosure to the modular mounting bracket.

15. The modular mounting bracket of claim 14, wherein each of the plurality of mounting arms include an s-shaped body.

* * * * *